United States Patent [19]

Heyen et al.

[11] Patent Number: 5,050,104

[45] Date of Patent: Sep. 17, 1991

[54] METHOD FOR NOTIFYING A TERMINAL USER OF AN ASYNCHRONOUS EVENT OCCURRENCE

[75] Inventors: John G. Heyen, Carrollton; Chander Kasiraj, Irving; Lovie A. Melkus, Carrollton; Timothy J. Wolf, Bedford, all of Tex.

[73] Assignee: International Business Machines Corporation, Armonk, N.Y.

[21] Appl. No.: 182,542

[22] Filed: Apr. 18, 1988

[51] Int. Cl.5 .............................................. G06F 15/62
[52] U.S. Cl. .................................................... 364/521
[58] Field of Search ... 364/518, 521, 522, 900 MS File; 364/200 MS File; 340/721, 723, 825.05, 825.52; 370/79, 90, 91

[56] References Cited

U.S. PATENT DOCUMENTS

| | | | |
|---|---|---|---|
| 4,403,303 | 9/1983 | Howes et al. | 364/900 |
| 4,438,492 | 3/1984 | Harmon, Jr. et al. | 364/900 X |
| 4,458,331 | 7/1984 | Amezcua et al. | 364/900 |
| 4,527,250 | 7/1985 | Galdun et al. | 364/900 |
| 4,532,588 | 7/1985 | Foster | 364/200 |
| 4,545,011 | 10/1985 | Lyon et al. | 364/200 |
| 4,574,284 | 3/1986 | Feldman et al. | 370/79 X |
| 4,611,277 | 9/1986 | Kemppainen et al. | 364/200 |
| 4,646,232 | 2/1987 | Chang et al. | 364/200 |
| 4,866,638 | 9/1989 | Cosentino et al. | 364/521 |

Primary Examiner—Heather R. Herndon
Attorney, Agent, or Firm—Andrew J. Dillon

[57] ABSTRACT

A method for notifying the user of a terminal attached to a host processor of the occurrence of an asynchronous event affecting the user. The notification method determines whether or not the user is in communication with the host processor and then generates and displays an icon, or other selectable graphic representation of the asynchronous event at the user's terminal. Selection of the graphic representation by the user will display additional details of the asynchronous event to the user at his or her terminal. In one embodiment of the present invention, an indication of the asynchronous event is stored at the host processor if the user is not in communication with the host processor and displayed to the user after communication is initiated.

7 Claims, 2 Drawing Sheets

METHOD FOR NOTIFYING A TERMINAL USER OF AN ASYNCHRONOUS EVENT OCCURRENCE

BACKGROUND OF THE INVENTION

1. Technical Field

This invention relates in general to methods of communication between a terminal user and a host processor and more particularly to a method for notifying a terminal user of the occurrence of an asynchronous event affecting that user.

2. Background Art

Communication methods between terminal users and host processors are well known in the prior art. These communication methods are generally directed to bi-directional communications schemes in which a terminal user and a host processor are communicating directly. Such methods work quite well and permit a terminal user to rapidly and effectively utilize host processor assets such as extensive databases, or processing capability. However, often it is necessary or desirable for a host processor to communicate with a terminal user at those times when the terminal user is not directly communicating with the host processor.

For example, while the terminal user is utilizing a database of the host processor, the system operator may wish to communicate with the terminal user to advise him or her that the system will be shutdown shortly for a period of time. Similarly, the receipt of electronic mail at the host processor for a particular terminal user may give rise to the need to communicate with that terminal user.

More recently, it has become common for multiple users to be permitted to access the same resources in the host processor. These so-called "affinity" users may then access electronic mail addressed to another affinity user, or access and alter documents belonging to another affinity user. It should be obvious that this situation may give rise to several circumstances in which it is desirable for a terminal user to be notified of an asynchronous event, that is, an event which is not initiated by that user.

Among the various situations in which an asynchronous event may occur, making it desirable to notify a terminal user, is the receipt of electronic mail for the user or an affinity user of the user, or the alteration of one user's documents by another user. In each case, it would be beneficial to provide a system wherein a notification may be generated whether or not the user is in direct communication with the host processor at the time of the event.

A limited form of notification of the occurrence of an asynchronous event is available in certain prior art systems which provide a textual notification to the user of the arrival of electronic mail. These systems generally provide such notification upon a direct inquiry by the terminal user or in response to an indirect inquiry (i.e. the calling of a main menu screen). However, there does not exist any prior art solutions which provide a notification to a terminal user of the occurrence of an asynchronous event which provides the user with additional information concerning the event.

Therefore, it should be obvious that a need exists for a method which permits a terminal user to receive notification of the occurrence of an asynchronous event along with additional information concerning that event.

SUMMARY OF THE INVENTION

It is therefore one object of the present invention to provide an improved method of user perceptible communication between the host processor and a terminal user.

It is another object of the present invention to provide an improved method of user perceptible communication between the host processor and a terminal user which permits the terminal user to receive unsolicited notification of the occurrence of an asynchronous event and additional information concerning that event.

It is yet another object of the present invention to provide an improved method of user perceptible communication between the host processor and terminal user which permits the terminal user to receive unsolicited notification of the activity of a second terminal user which effects the first user.

The foregoing objects are achieved as is now described. The notification method of the present invention first determines whether or not a terminal user in question is in communication with the host processor. Next, the method generates and displays an icon, or other selectable graphic representation of the asynchronous event at the user's terminal. Selection of the graphic representation by the user will then display additional details of the asynchronous event to the user at his or her terminal. In one embodiment of the present invention, an indication of the asynchronous event is stored at the host processor if the user is not in communication with the host processor and subsequently displayed to the user after communication is initiated.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
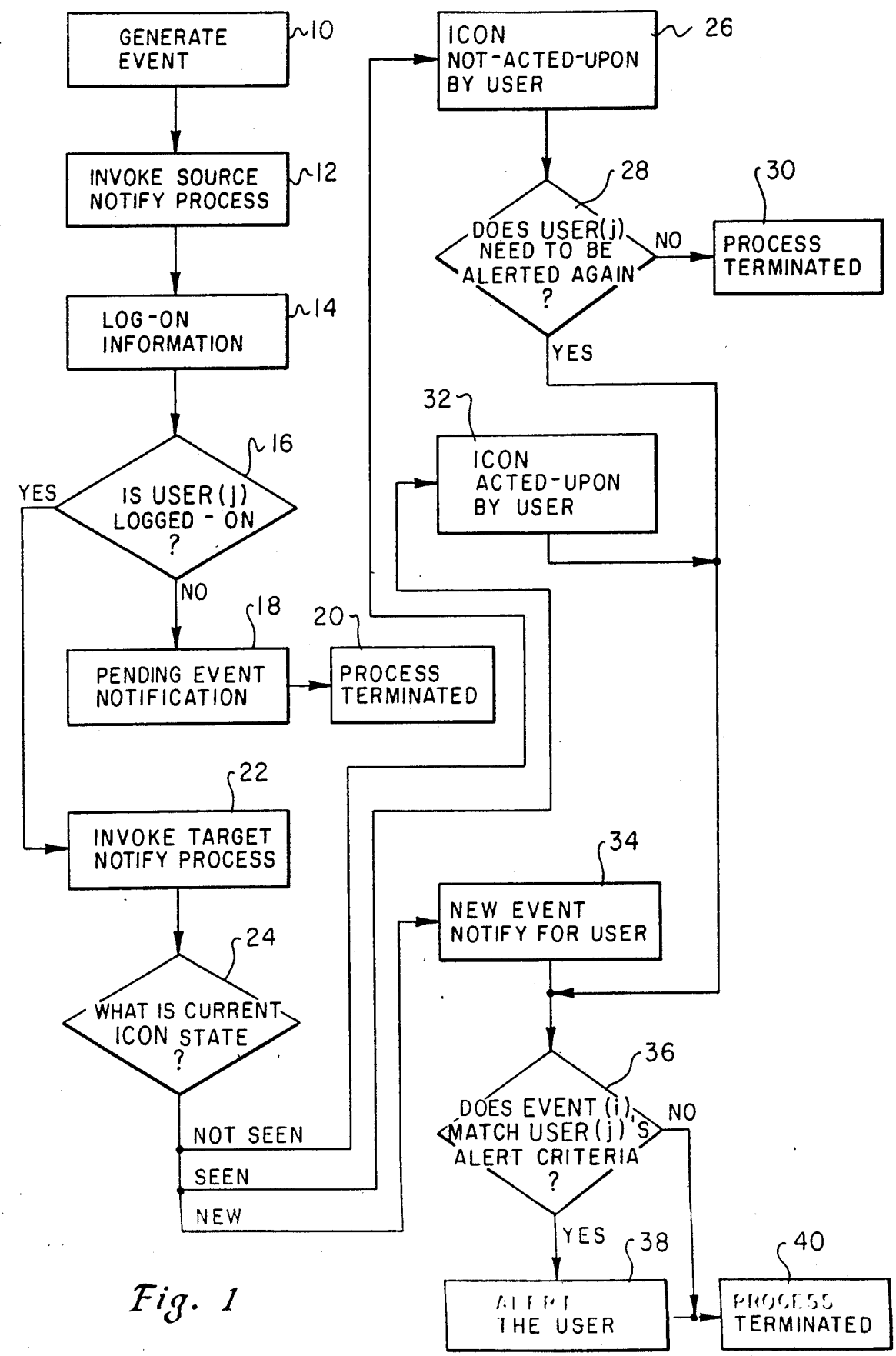
FIG. 1 depicts a logic flow diagram of the software operations associated with providing a terminal user with notification of an asynchronous event in accordance with the method of the present invention.

With reference now to the figures and in particular with reference to FIG. 1, there is depicted a logic flow diagram of the software operations associated with providing a terminal user with notification of an asynchronous event in accordance with the method of the present invention. As can be seen, block 10 is representative of the generation of an event message which includes details concerning the asynchronous event which has occurred. The event message preferably includes details such as the source, subject matter and time of arrival for electronic mail or a listing of user documents which have been or are being accessed or altered by an affinity user.

Next, the event message is stored and posted to a source notification process, as illustrated by block 12. The source notification process begins at the source by determining whether or not the terminal user in question is logged on to the host processor, as depicted in block 14.

In the event the terminal user in question is not logged on, as determined by block 16, a pending event notification process is begun as indicated at block 18, the event message is stored for subsequent notification and a logic flag is set. Thereafter, whenever the user logs on to the host processor, notification will take place. At this point, the process temporarily terminates, as depicted in block 20.

In those situations in which the terminal user in question is logged on to the host processor, a target notification process is invoked, as illustrated in block 22. Preferably, the target notification process is resident at the user's terminal and communicates with the source notification process at the host processor. The target notification process next determines the state of an "icon" which is associated with the type of event message received. An icon is a miniature selectable graphic representation which illustrates a particular type of message event and which can generally be selected by the terminal user and expanded to a full screen presentation which may include additional detail. Block 24 illustrates the determination of the icon status as discussed above.

In the event the icon representative of the particular event message in question is already being displayed, as depicted in block 26, then no further action is required if the user has already been alerted. This situation is representative of those circumstances in which a previous event message has caused the display of the icon in question. Next, block 28 determines whether or not the user needs to be alerted again, and if not, the process is terminated, as depicted in block 30.

Alternately, block 32 illustrates those situations in which the icon representative of the event message in question is already displayed and has been acted upon by the user. This may generally be illustrated by the alteration of some aspect of the icon. For example, the icon may change color to indicate prior selection by the user. No further action is required at this point unless the event message meets the system's or user's criterion for further alert status. It should be noted that system criterion may not be identical to the operator's criterion. The operator may elect not to be alerted; however, a notice from the system of imminent shut down will take precedence in accordance with the system criterion. Finally, as depicted in block 34, the event message may cause the display of a new icon which was not previously active. In this case, the icon is displayed and the user's alert criteria is determined.

Block 36 illustrates the determination of whether or not the event message received matches the alert criteria set by the system or the terminal user. Those skilled in the art will appreciate that this may be accomplished by setting an event classification for each type of event and checking that classification against a plurality of preset alert criterion for the operator or the system. If not, the process is terminated as depicted in block 40. If the alert criteria is matched, block 38 illustrates the generation of an additional alert signal, such as an electronic beep, to accompany the icon representation of the occurrence of an asynchronous event.

Figure 2:
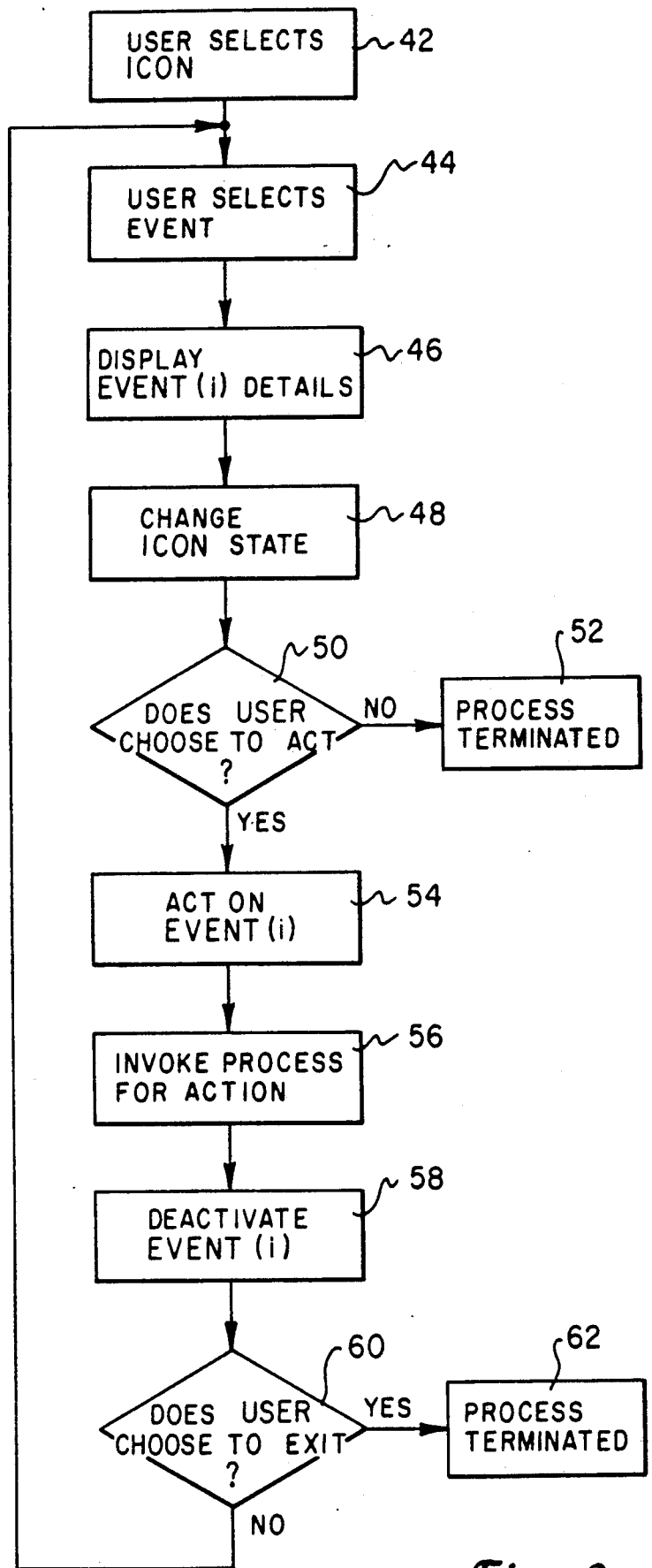
FIG. 2 depicts a logic flow diagram of the software operations characteristic of the response of a terminal user to the notification method of the present invention.

Referring now to FIG. 2, there is depicted a logic flow diagram of the software operations characteristic of the response of a terminal user to the notification process outlined above. As depicted in block 42, the user may select an icon representative of an asynchronous event, which, in the preferred embodiment of the present invention, will cause a display or list of additional details associated with the asynchronous event, such as the type of event, origin or list of documents altered or accessed by an affinity user.

Block 44 illustrates the selection by the user of a particular event from the list of events provided by the user's selection of the icon. In this manner, the user may simply and easily view a message, or the result of an asynchronous event without the necessity of leaving the application in which the user is currently involved and without the necessity of calling up a menu and then selecting an application which will permit viewing of the message or event.

As depicted in block 46, additional details of the event may also be selected by the user in the event that the first display includes a simple list of events or messages. Block 48 illustrates the modification of the icon state to the "seen" state indicative of the fact that the icon has been seen by the user but that no action has taken place.

Block 50 is utilized to determine whether or not the user has chosen to act, and if not, the process is terminated as illustrated in block 52. If the user has elected to act upon the asynchronous event, block 54 depicts the selection of a particular action (i.e. "view", "print", "store", or "save"). Block 56 illustrates the invocation of the process required by the actions selected by the user. This action passes the event message to the invoked process where the event message provides the information required to perform the invoked process.

Finally, as depicted in block 58, the event called upon above is deactivated, removing the icon representation from the terminal display and deleting the event message from the list of pending messages. Thereafter, the user may elect to exit or return to examine another icon representative of a second event occurrence, as depicted in block 60. An election to exit will terminate the process as illustrated in block 62.

In summary, the notification method of the present invention provides a simple and expedient method whereby a terminal user may be notified of the occurrence of an asynchronous event at the host processor or the action of an affinity user with regard to documents or records owned by the terminal user. A graphic representation or "icon" is provided which is representative of the type of event which has occurred, and by simply selecting the icon in question, the user may rapidly and efficiently view the message or event without the necessity of halting the application in which the user is currently employed.

While the invention has been particularly shown and described with reference to a preferred embodiment, it will be understood by those skilled in the art that various changes in form and detail may be made therein without departing from the spirit and scope of the invention.

We claim:

1. The method for notifying the user of a terminal attached to a host processor of the occurrence of an asynchronous event affecting said user, said method comprising the steps of:
   determining whether said user is in communication with said host processor;
   generating and displaying a graphic representation at said terminal indicative of said asynchronous event if said user is in communication with said host processor;

storing an indication of said asynchronous event if said user is not in communication with said host processor; and generating and displaying a graphic representation at said terminal indication of said stored indication of said asynchronous event in response to said user initiating communication with said host processor.

2. The method for notifying the user of a terminal attached to a host processor of the occurrence of an asynchronous event affecting said user according to claim 1 further including the step of:

generating an audible alert signal in conjunction with the generation of said graphic representation.

3. The method for notifying the user of a terminal attached to a host processor of the occurrence of an asynchronous event affecting said user according to claim 1 further including the step of:

removing said graphic representation in response to an action by said user in response to said asynchronous event.

4. A method for notifying the user of a terminal attached to a host processor of the occurrence of an asynchronous event affecting said user, said method comprising the steps of:

determining whether said user is in communication with said host processor;

generating and displaying a selectable graphic representation at said terminal indicative of the occurrence of an asynchronous event affecting said user, if said user is in communication with said host processor;

displaying at said terminal additional details of said asynchronous event in response to the selection by said user of said selectable graphic representation; and storing an indication of said asynchronous event if said user is not in communication with said host processor.

5. The method for notifying the user of a terminal attached to a host processor of the occurrence of an asynchronous event affecting said user according to claim 4 further including the step of:

generating an audible alert signal in conjunction with the generation of said selectable graphic representation.

6. The method for notifying the user of a terminal attached to a host processor of the occurrence of an asynchronous event affecting said user according to claim 4 further including the step of:

removing said selectable graphic representation in response to an action by said user after selection of said selectable graphic representation.

7. The method for notifying the user of a terminal attached to a host processor of the occurrence of an asynchronous event affecting said user according to claim 4 further including the step of:

generating and displaying a selectable graphic representation at said terminal indicative of said stored indication of said asynchronous event in response to said user initiating communication with said host processor.

* * * * *